US011845457B2

(12) United States Patent
Subosits et al.

(10) Patent No.: US 11,845,457 B2
(45) Date of Patent: Dec. 19, 2023

(54) SYSTEM AND METHOD FOR TRAINING AN OPERATOR OF A VEHICLE

(71) Applicant: Toyota Research Institute, Inc., Los Altos, CA (US)

(72) Inventors: John Subosits, Menlo Park, CA (US); Yan Ming Jonathan Goh, Palo Alto, CA (US); Michael Thompson, San Juan Capistrano, CA (US); Alexander R. Green, Redwood City, CA (US); Avinash Balachandran, Sunnyvale, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 323 days.

(21) Appl. No.: 17/179,609

(22) Filed: Feb. 19, 2021

(65) Prior Publication Data
US 2022/0266847 A1    Aug. 25, 2022

(51) Int. Cl.
*B60W 50/12*      (2012.01)
*B60W 50/08*      (2020.01)
(Continued)

(52) U.S. Cl.
CPC .......... *B60W 50/12* (2013.01); *B60W 50/087* (2013.01); *B60W 60/001* (2020.02);
(Continued)

(58) Field of Classification Search
CPC .. B60W 50/12; B60W 50/087; B60W 60/001; B60W 2510/18; B60W 2510/207; G06F 18/214
See application file for complete search history.

(56) References Cited

U.S. PATENT DOCUMENTS 5,823,288 A    10/1998   Buff, IV
7,565,230 B2    7/2009   Gardner et al.
(Continued)

FOREIGN PATENT DOCUMENTS

CA          2481516 A1     3/2006
JP         2018049243 A   *   3/2018

OTHER PUBLICATIONS

Gregersen, "Young drivers' overestimation of their own skill—An experiment on the relation between training strategy and skill," Accident Analysis & Prevention, vol. 28, No. 2, 16 pages (1996).
(Continued)

*Primary Examiner* — Aniss Chad
*Assistant Examiner* — Christine Nguyen Huynh
(74) *Attorney, Agent, or Firm* — Christopher G. Darrow; Darrow Mustafa PC

(57) ABSTRACT

A system for training an operator of a vehicle includes a processor and a memory in communication with the processor, which includes a safety module and a training module. The safety module has instructions that, when executed by the processor, cause the processor to determine when the vehicle is operating within a safe area based on at least one of: a location of the vehicle and a location of one or more objects with respect to the vehicle. The training module has instructions that, when executed by the processor, cause the processor to apply at least one brake of the vehicle when the vehicle is operating within the safe area to cause the vehicle to engage in an oversteer event, and collect operator response information when the vehicle engages in the oversteer event.

14 Claims, 7 Drawing Sheets

(51) Int. Cl.
*B60W 60/00* (2020.01)
*G06F 18/214* (2023.01)

(52) U.S. Cl.
CPC ....... *G06F 18/214* (2023.01); *B60W 2510/18* (2013.01); *B60W 2510/207* (2013.01)

(56) References Cited

U.S. PATENT DOCUMENTS

| | | | |
|---|---|---|---|
| 8,380,640 B2 | 2/2013 | Olsen, III et al. | |
| 9,656,639 B1* | 5/2017 | Brooks | B60T 8/885 |
| 10,150,410 B2 | 12/2018 | Medenica et al. | |
| 2010/0209890 A1* | 8/2010 | Huang | G09B 19/167 |
| | | | 434/66 |
| 2016/0339910 A1* | 11/2016 | Jonasson | B60W 10/20 |

OTHER PUBLICATIONS

Russell et al., "Design of variable vehicle handling characteristics using four-wheel steer-by-wire," IEEE Transactions on Control Systems Technology, vol. 24, No. 5, 1529-1540 (2016).

\* cited by examiner

SYSTEM AND METHOD FOR TRAINING AN OPERATOR OF A VEHICLE

TECHNICAL FIELD

The subject matter described herein relates, in general, to systems and methods for training an operator of a vehicle.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

A difficult challenge for typical human operators of vehicles, sometimes referred to as drivers, is controlling oversteering in emergencies. Production stability control systems are designed to assist the operator in this task by applying individual brakes to create stabilizing yaw moments on the vehicle. Current systems adjust the steering assist torque to try to guide the operator into taking corrective steering action. However, operators trained in emergency or performance driving make these corrections instinctively.

Operators may be trained to operate a particular vehicle using any one of several different training methodologies. In some cases, the training methodology involves classroom instructions, wherein operators are provided information regarding the safe operation of the vehicle in a classroom setting. In other cases, the training methodology involves field practice, wherein the operator of the vehicle in the presence of an instructor operates the vehicle in the field. Further still, in some cases, the training methodology includes both classroom instructions as well as field practice.

While training operators through classroom instructions and/or field practice may be useful in providing the operator with a basic skill set for operating the vehicle, this type of training generally does not involve developing an advanced set of skills that are performed instinctively. For example, field practice is generally done under normal operating situations, when the operator merely pilots the vehicle from one location to another. However, advanced and difficult driving situations, caused by either inclement weather, vehicle malfunction, the movement of other vehicles on the road, and the like, are generally not experienced in field practice. As such, operators rarely are trained to operate the vehicle under difficult scenarios, thus preventing or delaying the development of instinctive driving skills.

SUMMARY

This section generally summarizes the disclosure and is not a comprehensive explanation of its full scope or all its features.

In one embodiment, a system for training an operator of a vehicle includes a processor and a memory in communication with the processor. The memory may include a safety module and a training module. The safety module has instructions that, when executed by the processor, cause the processor to determine when the vehicle is operating within a safe area based on at least one of: a location of the vehicle and a location of one or more objects with respect to the vehicle. The training module has instructions that, when executed by the processor, cause the processor to apply at least one brake of the vehicle when the vehicle is operating within the safe area to cause the vehicle to engage in an oversteer event and collect operator response information when the vehicle engages in the oversteer event.

In another embodiment, a method for training an operator of a vehicle includes the steps of determining, by a processor, when the vehicle is operating within a safe area, applying, by the processor, at least one brake of the vehicle when the vehicle is operating within the safe area to cause the vehicle to engage in an oversteer event, and collecting, by the processor, operator response information when the vehicle engages in the oversteer event. The determination that the vehicle is operating within a safe area may be based on at least one of: a location of the vehicle and a location of one or more objects with respect to the vehicle.

In yet another embodiment, a non-transitory computer-readable medium may have instructions that, when executed by a processor, cause the processor to determine when a vehicle is operating within a safe area, apply at least one brake of the vehicle when the vehicle is operating within the safe area to cause the vehicle to engage in an oversteer event, and collect operator response information when the vehicle engages in the oversteer event. Like before, the determination that the vehicle is operating within a safe area may be based on at least one of: a location of the vehicle and a location of one or more objects with respect to the vehicle.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described is a system and method for training an operator of a vehicle. Moreover, as explained in the background section, most operator training methodologies involve classroom instruction and/or field training. Generally, the field training is performed under normal circumstances where the operator is generally not surprised with any difficult or unique situations. However, the system and method described can surprise an operator with an oversteering event until the operator steering response is automatic. In this way, the system and method train the operator's response at a higher level than possible with existing approaches since the response must be subconscious.

Moreover, the system and method determine if the vehicle being piloted by the operator is located in a safe area. Essentially, the safe area is an area that if the system and method initiate an oversteering event, the vehicle will not cause harm or damage to either the vehicle and/or the operator of the vehicle. In one example, the safe area may be determined by comparing a vehicle's location with respect to a geo-fenced area that may include a closed course specifically made for training operators of vehicles. If the vehicle is located within the geo-fenced area and is therefore located within the closed course, the system and method may deem that the vehicle is located in a safe area.

Additionally or alternatively, the system and method may determine the location of one or more objects with respect to the vehicle using one or more vehicle sensors. Here, the system and method may utilize the presence and distance of one or more objects to determine if the vehicle is operating in a safe area. Further still, the system and method may determine a predicted skid area if an oversteer event is initiated. The predicted skid area may include one or more predicted movements of the vehicle if an oversteer event is initiated. If the predicted skid area does not have any objects that may cause damage to the vehicle and/or the operator of the vehicle, the system and method may determine that the vehicle is operating in a safe area.

Once it is determined that the vehicle is operating in a safe area, the system and method may apply one or more brakes of the vehicle to cause the vehicle to engage in an oversteer event and collect operator response information when the vehicle engages in the oversteer event to determine how well the operator handles the oversteer event. The operator response information can be utilized to track an operator's skills, modify a training program, or even adjust the amount of assistance provided by the vehicle's electronic stability control system.

Figure 1:
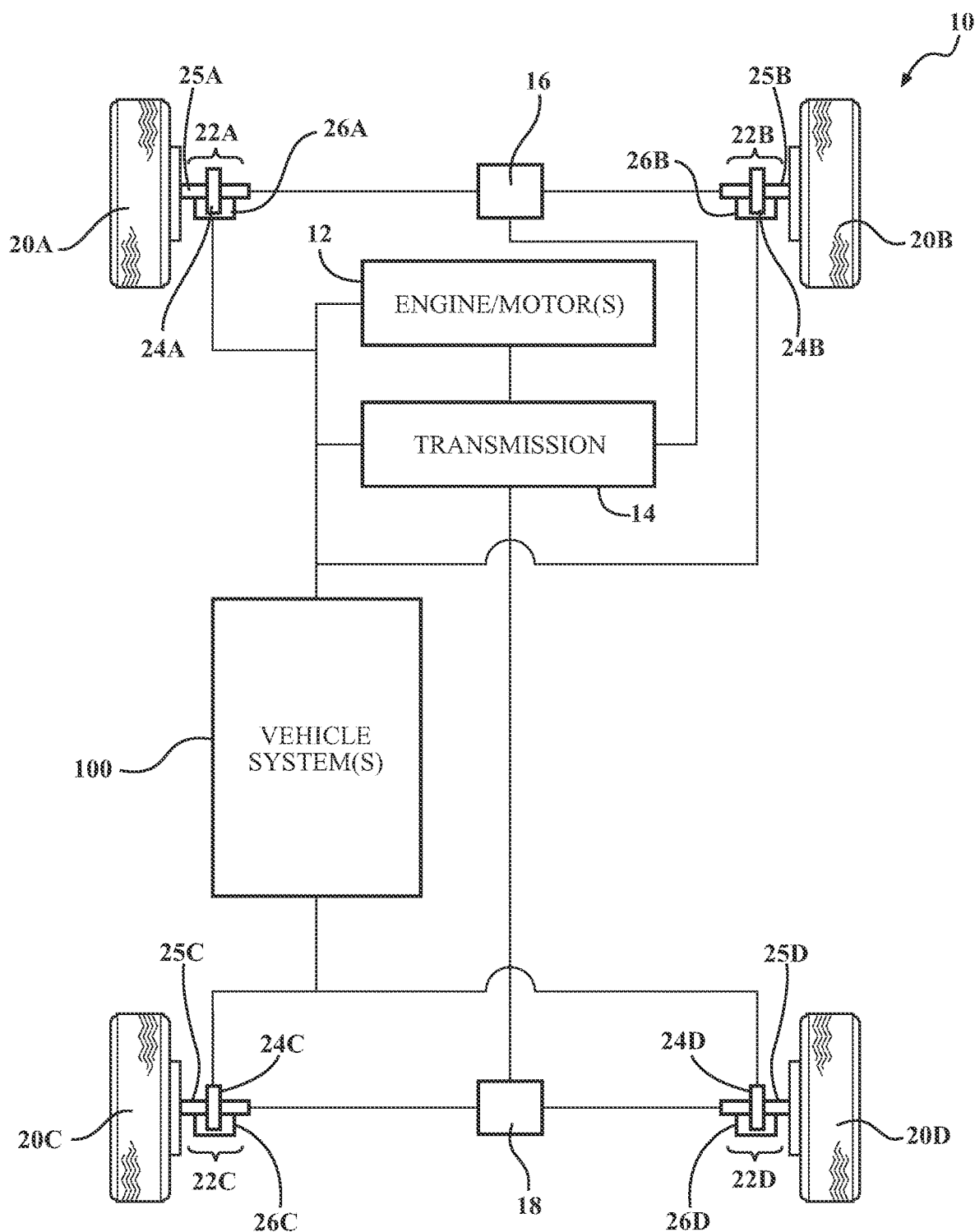
FIG. 1 illustrates a vehicle including vehicle systems that may incorporate an operator training system.

Referring to FIG. 1, an example of a vehicle 10 is illustrated. As used herein, a "vehicle" is any form of powered transport. In one or more implementations, the vehicle 10 is an automobile. While arrangements will be described herein with respect to automobiles, it will be understood that embodiments are not limited to automobiles. In some implementations, the vehicle 10 may be any robotic device or form of powered transport that a human operator may operate.

The vehicle 10 also includes various elements. It will be understood that in various embodiments, it may not be necessary for the vehicle 10 to have all of the elements shown in FIG. 1. The vehicle 10 can have any combination of the various elements shown in FIG. 1. Further, the vehicle 10 can have additional elements to those shown in FIG. 1.

In some arrangements, the vehicle 10 may be implemented without one or more of the elements shown in FIG. 1. While the various elements are shown as being located within the vehicle 10 in FIG. 1, it will be understood that one or more of these elements can be located external to the vehicle 10. Further, the elements shown may be physically separated by large distances and provided as remote services (e.g., cloud-computing services).

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In any case, FIG. 1 illustrates a vehicle 10 that may include an engine/motor 12 that may provide mechanical power to a transmission 14. The engine/motor 12 may be any type of engine/motor that can power a vehicle's movement, such as the vehicle 10. In some cases, the engine/motor 12 may be a traditional internal combustion engine, including gasoline and diesel-powered engines, but could be other types of engines as well. Additionally, instead of utilizing an engine, the engine/motor 12 may be one or more electrical motors that can provide power to the transmission 14 and be powered by electricity stored in one or more batteries. Further still, the engine/motor 12 may be a combination of different types of power-producing engines and/or motors, such as commonly found in hybrid electric vehicles.

Power provided from the engine/motor 12 is then provided to the transmission 14. The transmission 14 can take anyone of a number of different forms. In some cases, the transmission 14 may be a common mechanical transmission found on automobiles having internal combustion engines. Examples of these common mechanical transmissions include manual transmissions, automatic transmissions, continuously variable transmissions, semi-automatic transmissions, and dual-clutch transmissions. If the engine/motor 12 is an electrical motor, the transmission can be any of those mentioned above, but could also be simpler, such as a gear-reducing transmission or direct-drive transmission.

The transmission 14 may provide mechanical power to one or more differentials, such as the differential 16 and/or 18. The differential 16 may then provide power to one set of wheels, such as the wheels 20A and 20B, while the differential 18 may provide power to another set of wheels, such as the wheels 20C and 20D. In this example, the wheels 20A and 20B may be front wheels associated with the front of the vehicle 10, while the wheels 20C and 20D may be rear wheels associated with the rear of the vehicle 10.

While the vehicle 10 may, in one example, have an engine/motor 12 that provides power to the wheels 20A-20D by the transmission 14 and the differentials 16 and 18, it should be understood that other types of setups may also be utilized. For example, the wheels 20A and 20B may be powered by a first engine/motor, while the rear wheels 20C and 20D may be powered by a second engine/motor. Further, each of the wheels 20A-20D may have a dedicated motor, such as a hub motor, which may eliminate the need for the transmission 14 and/or the differentials 16 and 18.

One or more brakes 22A-22D may be associated with each of the wheels 20A-20D. Essentially, the brakes 22A-22D restrict and/or stop the movement of the wheels 20A-20D. Anyone of a number of different types of methodologies may be utilized to restrict and/or stop the movement of the wheels 20A-20D. For example, the brakes 22A-22D may utilize disc brakes, drum brakes, or combinations thereof. In this example, the brakes 22A-22D are disc brakes wherein each of the brakes 22A-22D has a disc 24A-24D that are in mechanical communication with the wheels 20A-20D via shafts 25A-25D, respectively. Each of the discs 24A-24D has associated calipers 26A-26D that can be actuated to squeeze discs 24A-24D. This action slows the rotation of the shafts 25A-25D either to reduce the wheels 20A-20D rotational speeds or to hold the wheels 20A-20D stationary.

The vehicle 10 may include one or more vehicle system(s) 100 that can control different components of the vehicle 10. For example, the vehicle system(s) 100 may have the ability to control the engine/motor 12, the transmission 14, and/or the brakes 22A-22D. In effect, by controlling the engine/motor 12, the transmission 14, and/or the brakes 22A-22D, the vehicle system(s) 100 can control the movement of the wheels 20A-20D, thereby controlling the movement of the vehicle 10.

Figure 2:
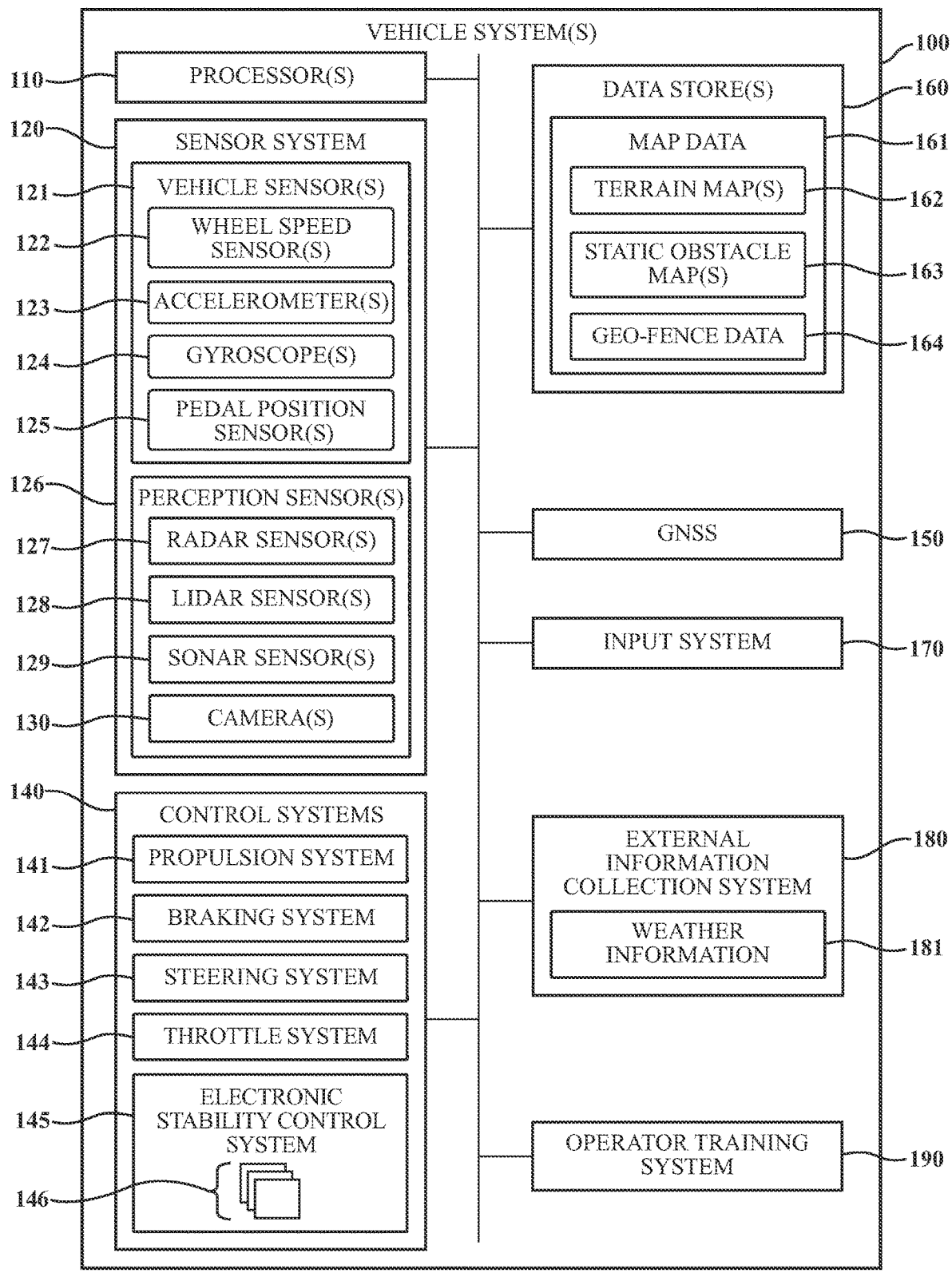
FIG. 2 illustrates a more detailed view of the vehicle systems of FIG. 1.

Referring to FIG. 2, a more detailed view of the vehicle system(s) 100 is shown. The vehicle system(s) 100 can have any combination of the various elements shown in FIG. 2. Further, the vehicle system(s) 100 can have additional elements to those shown in FIG. 2. In some arrangements, the vehicle system(s) 100 may be implemented without one or more of the elements shown in FIG. 2. While the various elements are shown as being located within the vehicle system(s) 100 in FIG. 2, it will be understood that one or more of these elements can be located external to the vehicle system(s) 100. Further, the elements shown may be physically separated by large distances and provided as remote services (e.g., cloud-computing services).

For the sake of brevity, many of the elements of the vehicle system(s) 100 will be described concurrently with the description of an operator training system 190. As explained briefly before and will be explained in greater detail later, the operator training system 190 can cause an oversteer event to occur when the operator is operating the vehicle 10. The operator training system 190 initiates the oversteer event after the operator training system 190 has determined that the vehicle 10 is operating in a safe area. The operator training system 190 can collect operator response information to track the operator's skills, modify a training program, and/or adjust one or more parameters 146 of an electronic stability control system 145.

Figure 3:
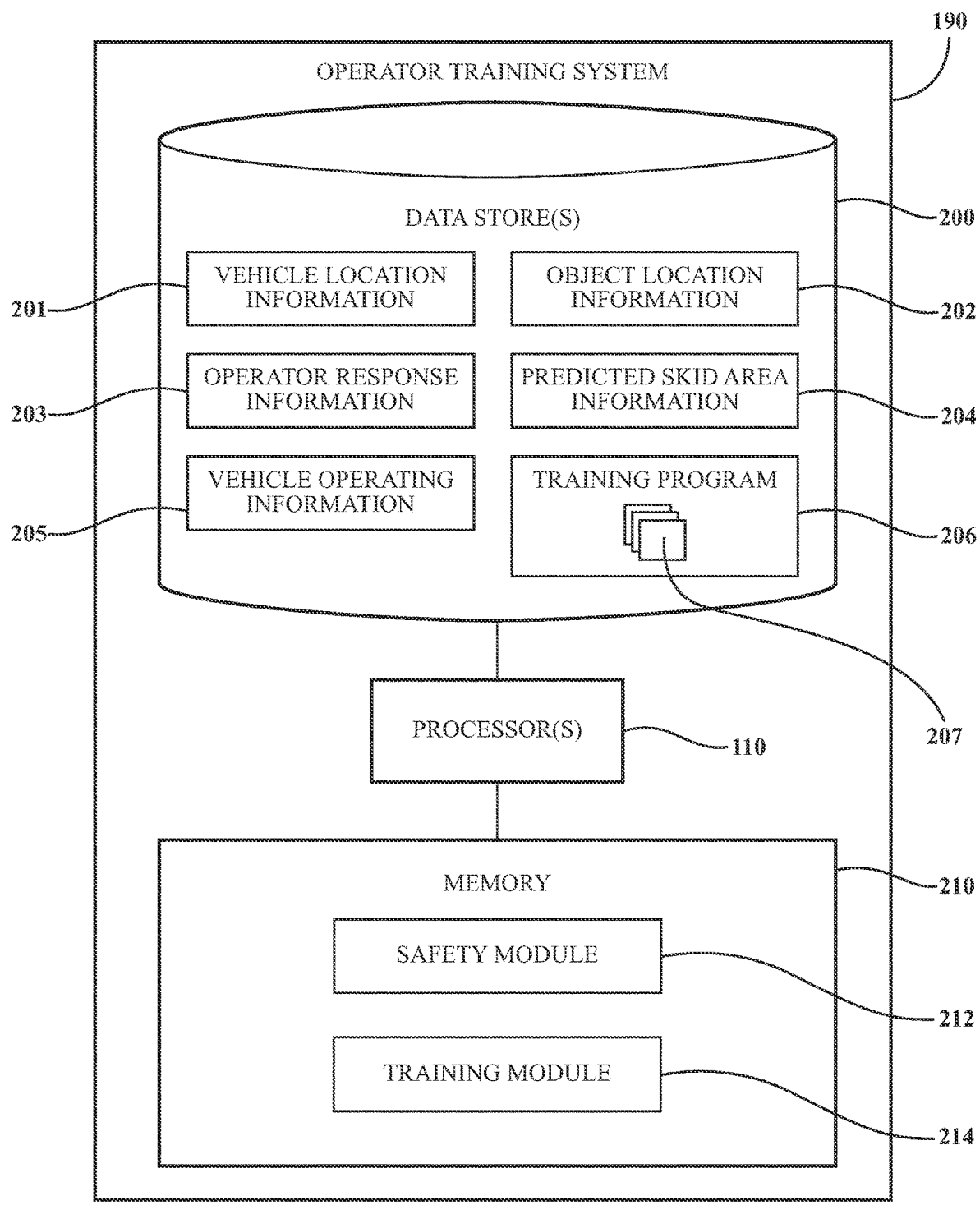
FIG. 3 illustrates a more detailed view of the operator training system.

Referring to FIG. 3, one embodiment of the operator training system 190 is further illustrated. As shown, the operator training system 190 includes a processor(s) 110. Accordingly, the processor(s) 110 may be a part of the operator training system 190, or the operator training system 190 may access the processor(s) 110 through a data bus or another communication path. In one or more embodiments, the processor(s) 110 is an application-specific integrated circuit that is configured to implement functions associated with a safety module 212 and/or a training module 214. In general, the processor(s) 110 is an electronic processor such as a microprocessor capable of performing various functions as described herein.

In one embodiment, the operator training system 190 includes a memory 210 that stores the safety module 212 and/or the training module 214. The memory 210 is a random-access memory (RAM), read-only memory (ROM), a hard disk drive, a flash memory, or other suitable memory for storing the safety module 212 and/or the training module 214. The safety module 212 and/or the training module 214 are, for example, computer-readable instructions that, when executed by the processor(s) 110, cause the processor(s) 110 to perform the various functions disclosed herein.

The safety module 212 and/or the training module 214 can be implemented as computer-readable program code that, when executed by a processor(s) 110, implement one or more of the various processes described herein. The safety module 212 and/or the training module 214 can be a component of the processor(s) 110, or the safety module 212 and/or the training module 214 can be executed on and/or distributed among other processing systems to which the processor(s) 110 is operatively connected. The safety module 212 and/or the training module 214 can include instructions (e.g., program logic) executable by one or more processor(s) 110.

In one or more arrangements, the safety module 212 and/or the training module 214 described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, the safety module 212 and/or the training module 214 described herein can be combined into a single module.

In one embodiment, the operator training system 190 includes one or more data store(s) 200. The data store(s) 200 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store(s) 200 stores data used by the safety module 212 and/or training module 214 in executing various functions. In one embodiment, the data store(s) 200 includes data related to vehicle location information 201, object location information 202, operator response information 203, predicted skid area information 204, vehicle operating information 205, and a training program 206 that may include one or more parameters 207. This data is stored in the data store(s) 200 will be described later in this specification when describing the various functions of the operator training system 190.

Accordingly, the safety module 212 includes instructions that, when executed by the processor(s) 110, cause the processor(s) 110 to determine when the vehicle 10 operates within a safe area. Moreover, the safe area can be defined as a number of different areas that generally are such that if an oversteer event is initiated by the operator training system 190 when the operator is operating the vehicle 10, the vehicle 10 will not experience or will not expect to experience any significant damage to the vehicle 10, the operator of the vehicle 10, and/or other objects located near the vehicle 10.

In one example, the safe area may be a determination regarding the location of the vehicle 10 to determine if the vehicle 10 is operating on a closed course, which may be a specialized course or other designated area for training operators of vehicles. In this case, the safe area is a specialized driving course for training operators of vehicles. As such, if a mishap occurs, unexpected parties, such as vehicles operating on nearby public roads but not within the closed course, will not likely be hindered and/or put in danger by the training of a particular operator.

In one example, the processor(s) 110 may receive information from a global navigation satellite system (GNSS) 150 shown in FIG. 2. Moreover, the GNSS 150 uses satellites to provide autonomous geo-spatial positioning. Signals sent by satellites are provided to the GNSS 150.

Using these signals, the GNSS 150 can determine the location of the vehicle 10. The location of the vehicle 10 may be stored as the vehicle location information 201 within the data store(s) 200.

The safety module 212 may cause the processor(s) 110 to compare the location of the vehicle 10 stored within the vehicle location information 201 to map data 161 that may be stored within the data store(s) 200 and/or other data store(s) 160, as shown in FIG. 2. The map data 161 can include maps of one or more geographic areas. In some instances, the map data 161 can include information or data on roads, traffic control devices, road markings, structures, features, and/or landmarks in the one or more geographic areas. The map data 161 can be in any suitable form. In some instances, the map data 161 can include aerial views of an area. In some instances, the map data 161 can include ground views of an area, including 360-degree ground views. The map data 161 can include measurements, dimensions, distances, and/or information for one or more items included in the map data 161 and/or relative to other items included in the map data 161. The map data 161 can include a digital map with information about road geometry. The map data 161 can be high quality and/or highly detailed.

In one or more arrangements, the map data 161 can include one or more terrain map(s) 162. The terrain map(s) 162 can include information about the ground, terrain, roads, surfaces, and/or other features of one or more geographic areas. The map data 161 can include one or more static obstacle map(s) 163. The static obstacle map(s) 163 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 163 can have location data, size data, dimension data, material data, and/or other data associated with it.

The map data 161 may also include geo-fence data 164. The geo-fence data 164 may be indications regarding the location of one or more particular features found within the map data 161. In one example, the geo-fence data 164 may be one or more geo-fences indicating the location of one or more closed courses for training the operators of vehicles, such as the vehicle 10. In one example, a closed course may be a particular set of roads that have been designed for training and/or other allowing an operator to operate a vehicle thereon. The closed course may include one or more roads or an area with restricted access to the public. In one example, the closed course may be far enough away from publicly accessible roads to prevent operators of vehicles within the closed course from interacting with vehicles, pedestrians, or other objects located outside of the closed course when operating their vehicle within the closed course.

Figure 4A:
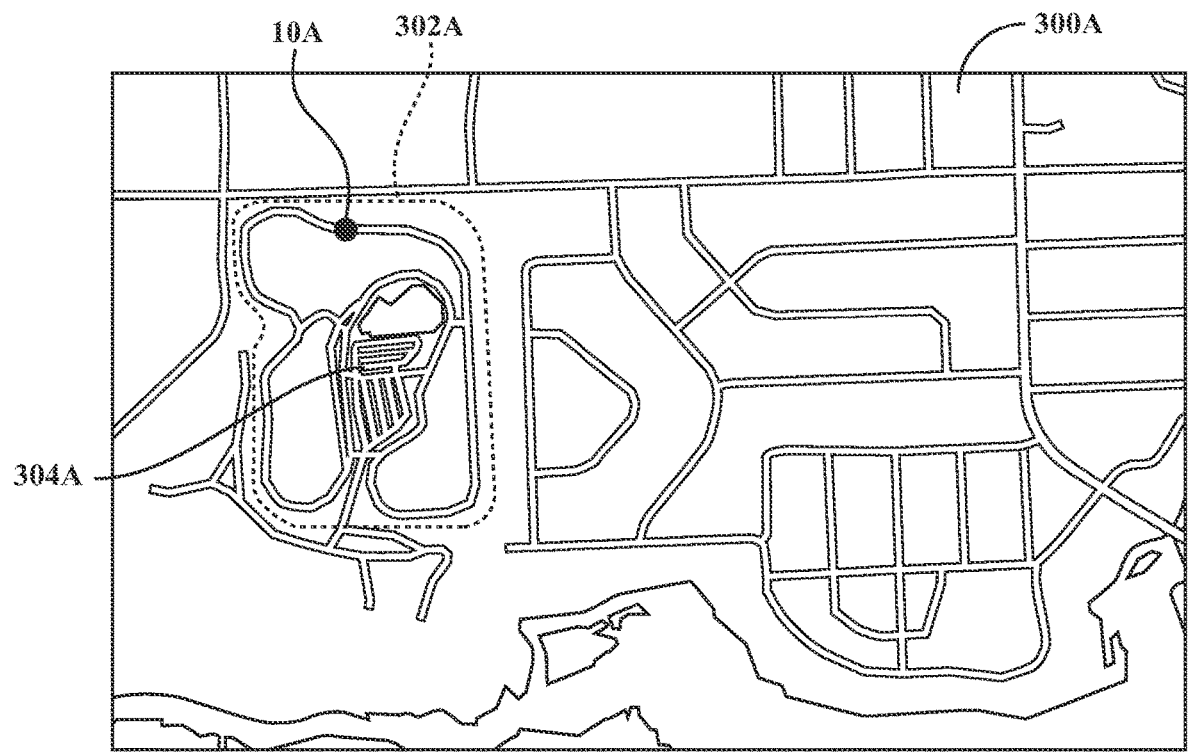
FIGS. 4A and 4B illustrate one example of determining when a vehicle is located within a safe area using a geofence and vehicle location.
Figure 4B:
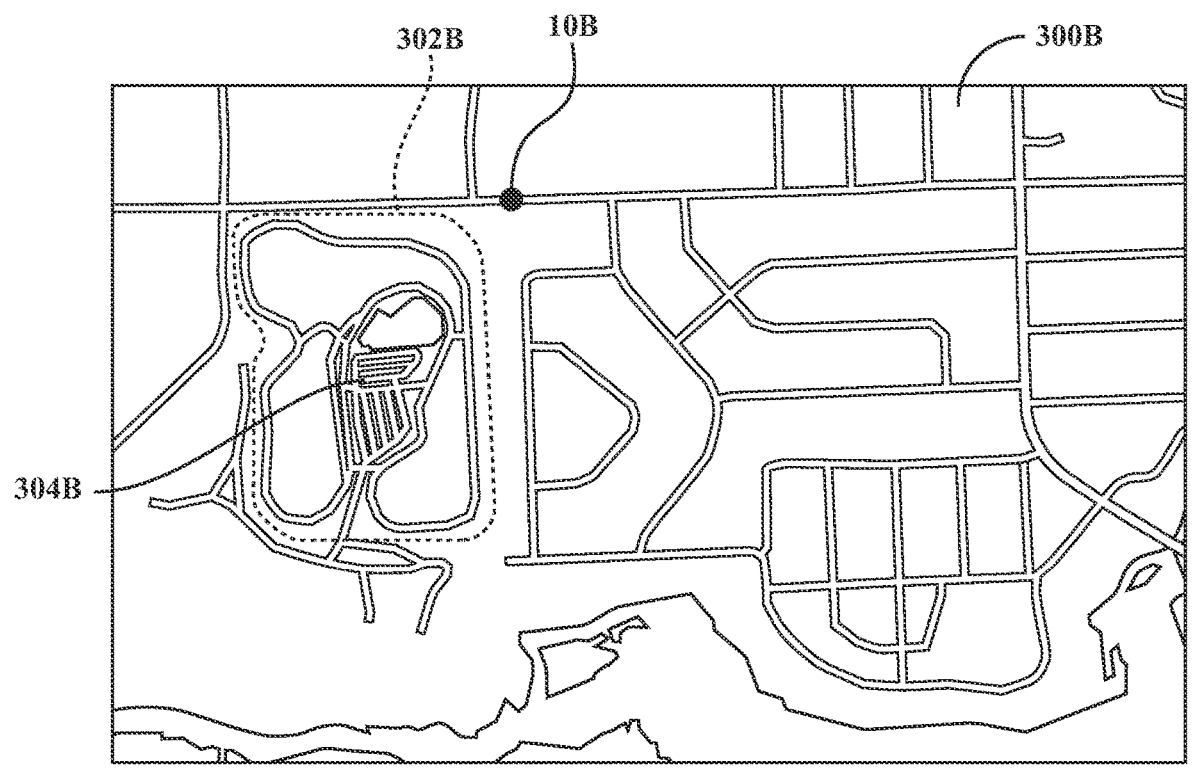

To explain this point further, reference is made to FIGS. 4A and 4B. FIG. 4A illustrates a map 300A that may be a map stored within the map data 161. Here, the map 300A includes a geo-fence 302A located around a closed course 304A. In this example, the GNSS 150 has determined that the vehicle 10A, which may be similar to the vehicle 10, is located within the geo-fence 302A and is therefore located on the closed course 304A. In this example, the safety module 212 would cause the processor(s) 110 to determine that the vehicle 10A is located in a safe area as the vehicle 10A is located on the closed course 304A.

Conversely, FIG. 4B illustrates a map 300B that may be similar to the map 300A and may be a map stored within the map data 161. Similarly, the map 300B includes a geo-fence 302B located around a closed course 304B. In this example, the GNSS 150 has determined that the vehicle 10B, which may be similar to the vehicle 10, is located outside the geo-fence 302B and is therefore located on the closed course 304B. In this example, the safety module 212 would cause the processor(s) 110 to determine that the vehicle 10A is not located within a safe area as the vehicle 10B is not located on the closed course 304B.

Additionally, or in the alternative, the safety module 212 may cause the processor(s) 110 to determine when the vehicle 10 is operating within a safe area based on the location of one or more objects with respect to the vehicle 10. Moreover, the safety module 212 may cause the processor to determine the location of one or more objects with respect to the vehicle 10. This may be accomplished in a number of different ways. For example, the processor(s) 110 may receive object location information from static obstacle map(s) 163. Additionally or alternatively, the processor(s) 110 may receive object location information from one or more perception sensor(s) 126. The location of one or more objects with respect to the vehicle 10 may be stored in the data store(s) 200 as object location information 202.

As best shown in FIG. 2, the perception sensor(s) 126 may be configured to acquire, and/or sense driving environment data. "Driving environment data" includes data or information about the external environment in which an autonomous vehicle is located or one or more portions thereof. For example, the perception sensor(s) 126 can be configured to detect, quantify and/or sense obstacles in at least a portion of the external environment of the vehicle 10 and/or information/data about such obstacles. Such obstacles may be stationary objects and/or dynamic objects. The perception sensor(s) 126 can be configured to detect, measure, quantify and/or sense other things in the external environment of the vehicle 10, such as, for example, lane markers, signs, traffic lights, traffic signs, lane lines, crosswalks, curbs proximate the vehicle 10, off-road objects, etc.

For example, in one or more arrangements, the perception sensor(s) 126 can include one or more radar sensor(s) 127, one or more LIDAR sensor(s) 128, one or more sonar sensor(s) 129, and/or one or more camera(s) 130. In one or more arrangements, the one or more camera(s) 130 can be high dynamic range (HDR) cameras or infrared (IR) cameras.

As such, the safety module 212 may cause the processor(s) 110 to receive environment information from the perception sensor(s) 126 regarding the location of one or more objects within an environment that the vehicle 10 is operating within. The safety module 212 may then cause the processor(s) 110 to determine when the vehicle 10 is operating within a safe area based on the location of the one or more objects.

Figure 5:
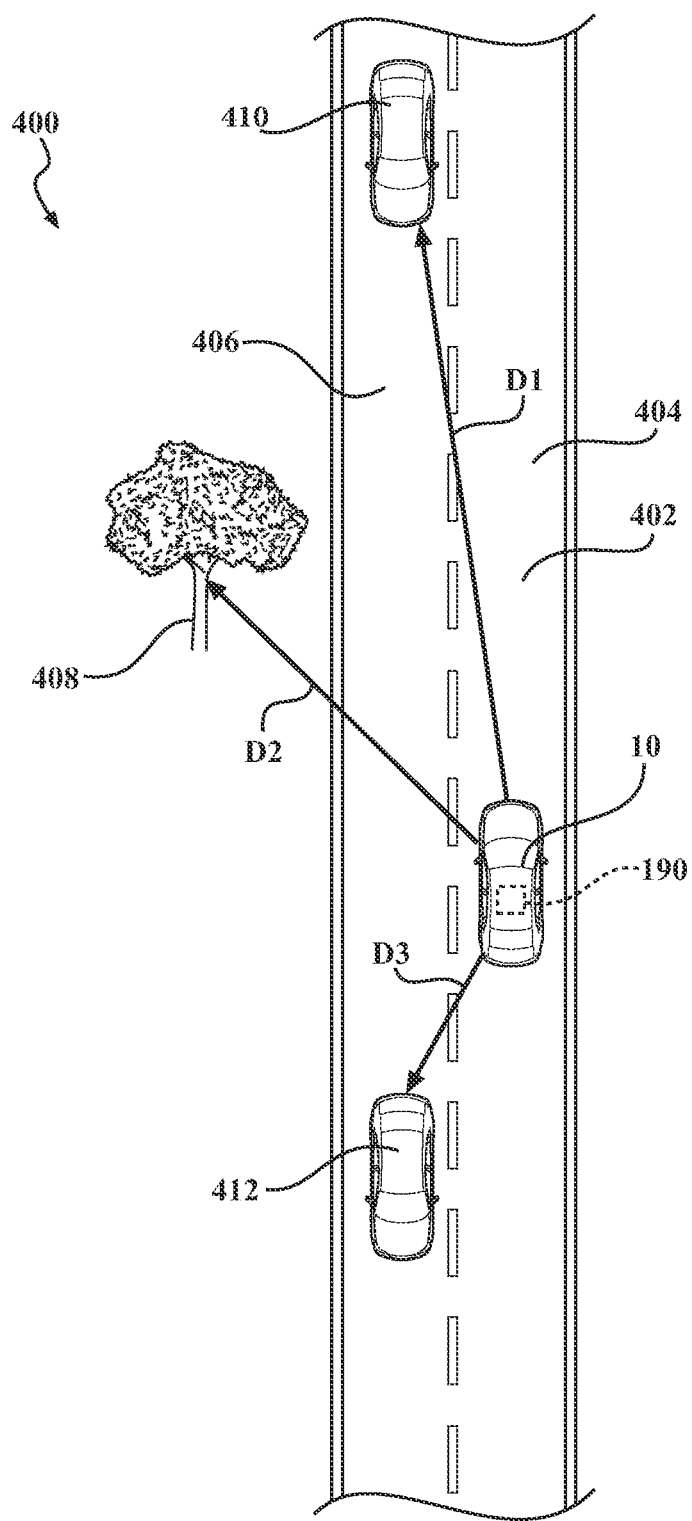
FIG. 5 illustrates another example of determining when a vehicle is located within a safe area using sensor information to determine the location of one or more objects external to the vehicle.

For example, referring to FIG. 5, an example environment 400 having a road 402 that includes a northbound lane 404 and a southbound lane 406 is shown. The vehicle 10, having the operator training system 190, is traveling north on the northbound lane 404. Here, the safety module 212 has caused the processor(s) 110 to detect several objects within the example environment 400. These objects include a tree 408, a first vehicle 410, and a second vehicle 412. In this example, the first vehicle 410 and the second vehicle 412 are both traveling south in the southbound lane 406.

The safety module 212 may cause the processor(s) 110 to determine the relative location of the tree 408, the first vehicle 410, and the second vehicle 412. In addition, the relative locations may also include the distances D1, D2, and/or D3 to the tree 408, the first vehicle 410, and the second vehicle 412, respectively. Other information regarding the obstacles 408-412 can also be determined by the processor(s) 110, such as the speed, direction, object type, etc.

Here, the safety module 212 may cause the processor(s) 110 to determine that the vehicle 10 is not operating within a safe area based on the location of the tree 408 and the first vehicle 410. This may be based on the relative closeness of the tree 408 to the vehicle 10 and/or the speed, direction, and location of the first vehicle 410 towards the vehicle 10. The safety module 212 may cause the processor(s) 110 to determine that the second vehicle 412 causes no immediate issues, as it is located behind the vehicle 10 and is heading away from the vehicle 10. As such, while in this example environment 400, the vehicle 10 is not located in a safe area, if this example environment 400 did not include the tree 408 and the first vehicle 410 but still included the second vehicle 412, the safety module 212 may have caused the processor(s) 110 to determine that the vehicle was operating within a safe area.

In another example, the safety module 212 may cause the processor(s) 110 to determine if the vehicle 10 is operating within a safe area by determining a predicted skid area. The predicted skid area may be stored within the predicted skid area information 204 of the data store(s) 200. The predicted skid area is an area where the vehicle 10 may travel when the operator training system 190 causes the vehicle 10 to engage in an oversteer event. More particularly, the safety module 212 may cause the processor(s) 110 to determine the predicted skid area and determine if any objects are located within the predicted skid area. If there are objects located within the predicted skid area, the safety module 212 causes the processor(s) 110 to determine that the vehicle 10 is not within a safe area. Conversely, if no objects are located within the predicted skid area, the safety module 212 causes the processor(s) 110 to determine that the vehicle is within a safe area.

Figure 6:
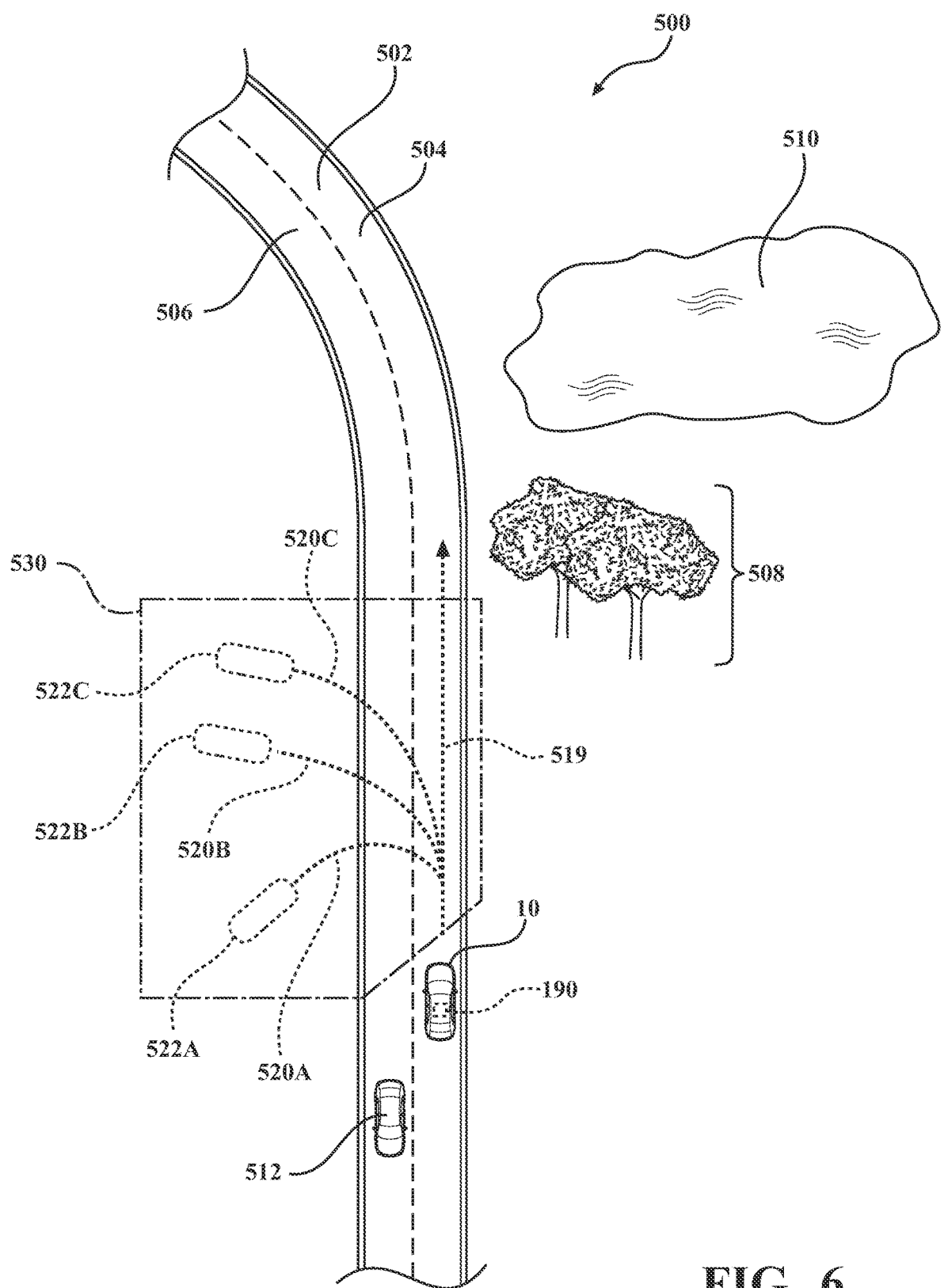
FIG. 6 illustrates another example of determining when a vehicle is located within the safe area by determining a predicted skid area if the operator training system initiates an oversteering event.

For example, referring to FIG. 6 illustrated is an environment 500 that includes a road 502 that includes a generally northbound lane 504 and a southbound lane 506. In this example, the vehicle 10, having the operator training system 190, is traveling north upon the northbound lane 504. The environment 500 also includes other objects, such as trees 508, a lake 510, and a vehicle 512 traveling south in the southbound lane 506.

Here, the safety module 212 may cause the processor(s) 110 to determine a predicted skid area 530 that generally indicates an area where the vehicle 10 may travel if the operator training system 190 initiates an oversteer event causing the vehicle to skid and potentially deviate from its intended route 519. Here, the safety module 212 may cause the processor(s) 110 to receive the vehicle operating information 205 from the data store(s) 200 to help determine the predicted skid area 530.

The vehicle operating information 205 of the vehicle 10 can include the trajectory of the vehicle 10, wheel slip information regarding a wheel slip of one of the wheels 20A-20D steering wheel position of the vehicle 10, accelerator pedal position, brake pedal position, heading of the vehicle 10, and/or a sideslip angle of the vehicle 10. Information regarding the vehicle operating information 205 may be generated by one or more vehicle sensor(s) 121. The vehicle sensor(s) 121 can detect, determine, and/or sense information about the vehicle 10 itself.

In one or more arrangements, the vehicle sensor(s) 121 can be configured to detect, and/or sense position and orientation changes of the vehicle 10, such as, for example, based on inertial acceleration. In one or more arrangements, the vehicle sensor(s) 121 can include one or more wheel speed sensor(s) 122 for detecting the speed of the wheels 20A-20D, one or more accelerometers 123, one or more gyroscopes 124, one or more pedal position sensor(s) 125 for the detecting the position of the brake pedal, accelerator pedal, and any other sensors capable of measuring the movement or operating characteristics of the vehicle 10. The vehicle sensor(s) 121 can be configured to detect, and/or sense one or more characteristics of the vehicle 10. As such, information from the vehicle sensor(s) 121 can be used to determine the trajectory of the vehicle 10, wheel slip information regarding a wheel slip of one of the wheels 20A-20D steering wheel position of the vehicle 10, accelerator pedal position, brake pedal position, heading of the vehicle 10, and/or a sideslip angle of the vehicle 10.

Using the vehicle operating information 205, the safety module 212 can cause the processor(s) 110 to predict one or more paths 520A-520C that the vehicle 10 may take. This may be determined by having the processor(s) 110 simulate the movement of the vehicle 10 based on a number of different simulation algorithms that can predict the movement of the vehicle 10, such as one or more paths 520A-520C the vehicle 10 may take if and oversteer event is initiated. Additionally, the simulation algorithms may determine resting locations 522A-522C associated with each of the one or more paths 520A-520C. The resting locations 522A-522C indicate predicted stop locations of the vehicle 10 if an understeer event is initiated.

Using the information regarding the predicted movement of the vehicle 10 if an oversteer event is initiated, such as using the one or more paths 520A-520C and/or the resting locations 522A-522C of the vehicle 10, the safety module 212 may cause the processor(s) 110 to determine the predicted skid area 530 which should generally include the one or more paths 520A-520C and/or the resting locations 522A-522C of the vehicle 10. The predicted skid area 530 may also include some additional areas located outside the one or more paths 520A-520C and/or the resting locations 522A-522C to provide some additional buffer in case the algorithms used to predict the one or more paths 520A-520C and/or the resting locations 522A-522C are not precisely accurate.

Once the predicted skid area 530 is determined, the safety module 212 may cause the processor(s) 110 to determine if any objects are located within the predicted skid area 530. As explained previously, objects, such as the trees 508, the lake 510, and/or the vehicle 512 of the environment 500 may be detected using the perception sensor(s) 126 and/or information from the map data 161, such as the static obstacle map(s) 163. If it is determined that no objects are located within the predicted skid area 530, the safety module 212 may cause the processor(s) 110 to determine that the vehicle 10 is located within a safe area. In the example shown in FIG. 6, no objects are located within the predicted skid area 530 and, as such, the vehicle 10 is operating within a safe area. However, if objects were located within the predicted skid area 530, the safety module 212 may cause the processor(s) 110 to determine that the vehicle 10 is not operating within a safe area.

In yet another example, and in addition to or in the alternative to determining if the vehicle 10 is located within a safe area described above, the safety module 212 may cause the processor(s) 110 to determine the overall weather conditions that the vehicle 10 is operating within. In one example, information regarding the weather conditions may be provided to the processor(s) 110 by an external information collection system 180. The external information collection system 180 may be a system that can communicate with external electronic devices, such as servers that collect and distribute weather-related information either directly, or through one or more intermediaries. Here, the external information collection system 180 may communicate with external servers that collect and disseminate weather information, such as the weather information 181.

Using the weather information 181, the safety module 212 may cause the processor(s) 110 to determine the overall weather conditions that the vehicle 10 is operating within to determine if the vehicle is operating within a safe area. For example, if the weather information 181 indicates that the vehicle 10 is operating within an area that is experiencing or has recently experienced inclement weather, such as rain, snow, fog, and the like, the safety module 212 may cause the processor(s) 110 to determine that the vehicle 10 is not operating within a safe area. This type of information indicates the overall state of the road that the vehicle 10 may be utilizing.

In yet another example, the operator training system 190 may have the ability to have the operator override any determination that the vehicle 10 is operating within a safe or not safe area. For example, the vehicle system(s) 100 can include an input system 170. An "input system" includes any device, component, system, element or arrangement, or groups that enable information/data to be entered into a machine. The input system 170 can receive an input from the operator of the vehicle 10. In one example, the operator of the vehicle 10 can indicate that the vehicle 10 is operating within a safe area or is potentially not operating within a safe area to allow/prevent the operator training system 190 from initiating an oversteer event.

Once it is determined that the vehicle 10 is operating within a safe area, the training module 214 may cause the processor(s) 110 to cause the vehicle 10 to engage in an oversteer event. An oversteer event is when the vehicle 10 turns (steers) by more than the amount commanded by the operator. This may be performed by having the processor(s) 110 communicate with the control systems 140 of the vehicle 10. The control systems 140, shown in FIG. 2, may include a propulsion system 141, a braking system 142, a steering system 143, a throttle system 144, and an electronic stability control system 145 that may have one or more parameters 146. Each of these systems can include one or more devices, components, and/or a combination thereof, now known or later developed.

In one example, to initiate an oversteer event, the processor(s) 110 communicates with the braking system 142 to apply at least one of the brakes 22A-22D of the vehicle 10 to cause the vehicle to engage in an oversteer event. In one example, the rear brakes of the vehicle 10 may be actuated to cause the oversteer event. As such, to cause an oversteer event, the processor(s) 110 may cause one or more of the brakes 22C and 22D to brake the rear wheels 20C and 20D of the vehicle 10, causing the vehicle 10 to slide, creating an oversteer event. Other types of control systems may also be utilized when initiating the oversteering event. For example, if the vehicle 10 is a rear-wheel drive, clutch and transmission control may be coordinated as needed to avoid stalling the engine.

The training module 214 may cause the processor(s) 110 to collect the operator response information 203 when the vehicle 10 engages in the oversteer event. The operator response information 203, as explained previously, may be stored within the data store(s) 200. The operator response information 203 may include information collected by the vehicle 10 as the operator operates the vehicle 10 during the oversteer event. As such, this information may be collected from any one of the sensors forming the sensor system 120, information from the control systems 140, or other information, such as the location of the vehicle 10 determined by the GNSS 150.

As such, the operator response information can include any of the following: a response time by the operator to the oversteer event, appropriateness of a response of the operator to a degree of instability caused by the oversteer event, a trajectory deviation during the oversteer event from a pre-oversteer event vehicle trajectory, a smoothness of a path taken by the vehicle during the oversteer event, an amount of assistance provided by an electronic stability control system 145 of the vehicle 10 during the oversteer event, and closeness to a boundary of stability of the vehicle 10 during the oversteer event.

The operator response information can monitor the operator's performance, improve the vehicle's overall safety, and/or modify a training program for the operator. In one example, the training module 214 may cause the processor(s) 110 to modify one or more parameters 146 of the electronic stability control system 145 based on the operator response information. Moreover, the electronic stability control system 145 can detect the loss of traction of one or more of the wheels 20A-20D of the vehicle 10 using information from the vehicle sensor(s) 121. When electronic stability control system 145 detects loss of steering control, the electronic stability control system 145 automatically applies the brakes to help steer the vehicle where the driver intends to go based on one or more parameters 146. Braking is automatically applied to 20A-20D individually to counter understeer and/or oversteer. Based on the operator response information, the processor(s) 110 can modify the one or more parameters 146 to either provide additional assistance or less assistance to the operator based on how well the operator handled an oversteering event.

In another example, the training module 214 may cause the processor(s) 110 to modify one or more parameters 207 of a training program 206 for training the operator of the vehicle 10 based on the operator response information. Moreover, depending on how well the operator handled an oversteer event, the processor(s) 110 can modify the one or more parameters 207 of the training program 206 to make the next oversteer event more or less challenging. For example, if the operator performed poorly, the next oversteer event may be less challenging to provide additional instances to allow the operator to master a less challenging oversteer event. As the operator improves, more challenging oversteer events may be initiated.

Figure 7:
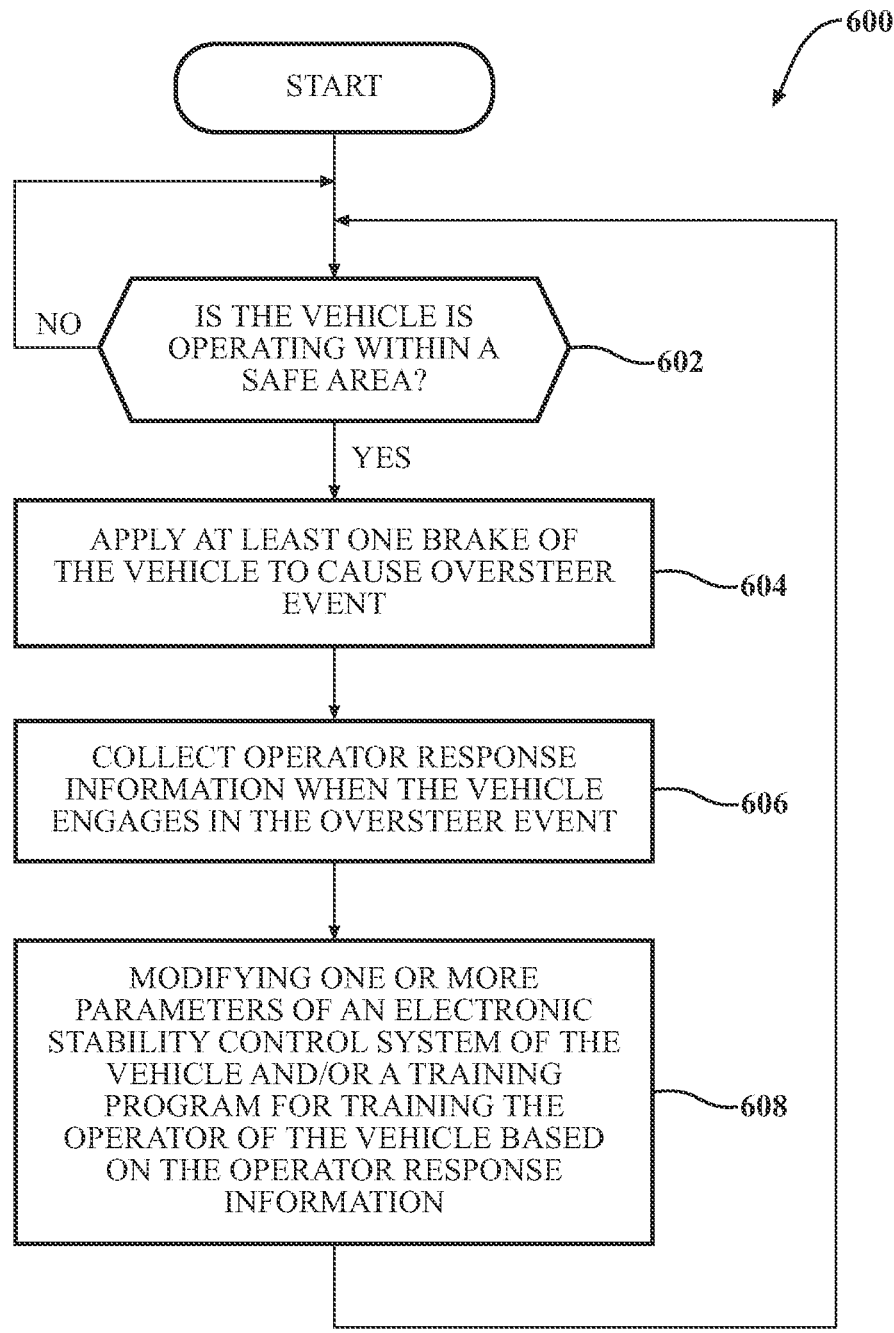
FIG. 7 illustrates a method for training an operator of the vehicle.

Referring to FIG. 7, a method 600 for training an operator of a vehicle is shown. The method 600 will be described from the viewpoint of the vehicle 10 of FIG. 1 and the operator training system 190 of FIGS. 2 and 3. However, it should be understood that this is just one example of implementing the method 600. While method 600 is discussed in combination with the operator training system 190, it should be appreciated that the method 600 is not limited to being implemented within the operator training system 190 but is instead one example of a system that may implement the method 600.

The method 600 begins at step 602, wherein the safety module 212 includes instructions that, when executed by the processor(s) 110, cause the processor(s) 110 to determine when the vehicle 10 operates within a safe area. The safe area can be defined as a number of different areas that generally are such that if an oversteer event is initiated by the operator training system 190 when the operator is operating the vehicle 10, the vehicle 10 will not experience or will not expect to experience any significant damage to the vehicle 10, the operator of the vehicle 10, and/or other parties located near the vehicle 10.

For example, as explained previously, the safe area may be determined by comparing the position of the vehicle 10 is determined by the GNSS 150 to determine if the vehicle is located within a geo-fenced area that has been designated as a safe area. The geo-fenced area may be a closed course specifically designed to train operators of vehicles, as shown and explained in FIGS. 4A and 4B. Alternatively, the safe area may be determined by using information from the perception sensor(s) 126 to determine the location of objects with respect to the vehicle 10, as shown and explained in FIG. 5. Further still, the safe area may be determined by ascertaining if objects are present within the predicted skid area, as shown and explained in FIG. 6. Weather-related information may also be utilized to determine if the vehicle 10 is operating within a safe area based on the road conditions that vehicle 10 is utilizing.

If the vehicle 10 is not operating within a safe area, the method 600 returns to step 602. Upon determining that the vehicle 10 is operating within a safe area, the method 600 proceeds to step 604. In step 604, the training module 214 may cause the processor(s) 110 to cause the vehicle 10 to engage in an oversteer event. As stated previously, an oversteer event is when the vehicle 10 turns (steers) by more than the amount commanded by the operator. This may be performed by having the processor(s) 110 communicate with the control systems 140 of the vehicle 10. In one example, to initiate an oversteer event, the processor(s) 110 communicates with the braking system 142 to apply at least one of the brakes 22A-22D of the vehicle 10 to cause the vehicle 10 to engage in an oversteer event.

In step 606, the training module 214 may cause the processor(s) 110 to collect the operator response information 203 when the vehicle 10 engages in the oversteer event. The operator response information 203 may include information collected by the vehicle 10 as the operator operates the vehicle during the oversteer event. As such, this information may be collected from any one of the sensors forming the sensor system 120, information from the control systems 140, or other information, such as the location of the vehicle 10 determined by the GNSS 150.

In step 608, the training module 214 may cause the processor(s) 110 to modify one or more parameters 146 of the electronic stability control system 145 or one or more parameters 207 of a training program 206 for training the operator based on the operator response information. For example, the processor(s) 110 can modify the one or more parameters 146 to either provide additional assistance or less assistance to the operator based on how well the operator handled an oversteering event. Alternatively or additionally, depending on how well the operator handled an oversteer event, the processor(s) 110 can modify the one or more parameters 207 of the training program 206 to make the next oversteer event more or less challenging. Thereafter, the method 600 may and/or may return to step 602 and begin again.

As such, the operator training system 190 and method 600 described can surprise an operator with an oversteering event until the operator steering response is automatic. At the same time, the operator training system 190 and method 600 do not surprise the operator in an area that may cause harm to the operator or the vehicle that the operator is utilizing. In this way, the operator training system 190 and method 600 train the operator's response at a higher level than possible with existing approaches since the response must be subconscious, while posing less danger to the operator or others.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In this document's context, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the terms "a" and "an" are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for training an operator of a vehicle comprising:
a processor;
a memory in communication with the processor, the memory having a safety module and a training module;
the safety module having instructions that, when executed by the processor, cause the processor to determine a predicted skid area indicating an area that encompasses predicted paths and resting locations the vehicle will utilize when an oversteer event occurs and determine when the vehicle is operating within a safe area when the predicted skid area does not include one or more objects; and
the training module having instructions that, when executed by the processor, cause the processor to:
apply at least one brake of the vehicle when the vehicle is operating within the safe area to cause the vehicle to engage in the oversteer event, and
collect operator response information when the vehicle engages in the oversteer event.

2. The system of claim 1, wherein the safety module further includes instructions that, when executed by the processor, cause the processor to:
receive vehicle operating information from one or more vehicle sensors regarding an operation of the vehicle; and
determine the predicted skid area based on the vehicle operating information.

3. The system of claim 2, wherein the vehicle operating information includes at least one of: a trajectory of the vehicle, wheel slip information regarding a wheel slip of one or more wheels of the vehicle, steering wheel position, accelerator pedal position, and brake pedal position, a heading of the vehicle, a sideslip angle of the vehicle.

4. The system of claim 1, wherein the operator response information includes one or more of:
a response time by the operator to the oversteer event;
appropriateness of a response of the operator to a degree of instability caused by the oversteer event;
a trajectory deviation during the oversteer event from a pre-oversteer event vehicle trajectory;
a smoothness of a path taken by the vehicle during the oversteer event;
an amount of assistance provided by an electronic stability control system of the vehicle during the oversteer event; and
closeness to a boundary of stability of the vehicle during the oversteer event.

5. The system of claim 1, wherein the training module further includes instructions that, when executed by the processor, cause the processor to modify one or more parameters of an electronic stability control system of the vehicle based on the operator response information.

6. The system of claim 1, wherein the training module further includes instructions that, when executed by the processor, cause the processor to modify one or more parameters of a training program for training the operator of the vehicle based on the operator response information.

7. The system of claim 1, wherein the safety module further includes instructions that, when executed by the processor, cause the processor to determine when the vehicle is operating within the safe area based on weather-related information, wherein the weather-related information includes information related to at least one of: a state of a road the vehicle is utilizing and overall weather conditions experienced by the vehicle.

8. A method for training an operator of a vehicle, the method comprising the steps of:
   determining, by a processor, a predicted skid area indicating an area that encompasses predicted paths and resting locations the vehicle will utilize when an oversteer event occurs;
   determining, by the processor, when the vehicle is operating within a safe area when the predicted skid area does not include one or more objects;
   applying, by the processor, at least one brake of the vehicle when the vehicle is operating within the safe area to cause the vehicle to engage in the oversteer event; and
   collecting, by the processor, operator response information when the vehicle engages in the oversteer event.

9. The method of claim 8, further comprising the steps of:
   receiving, by the processor, vehicle operating information from one or more vehicle sensors regarding an operation of the vehicle; and
   determining, by the processor, the predicted skid area based on the vehicle operating information.

10. The method of claim 9, wherein the vehicle operating information includes at least one of: a trajectory of the vehicle, wheel slip information regarding a wheel slip of one or more wheels of the vehicle, steering wheel position, accelerator pedal position, and brake pedal position, a heading of the vehicle, a sideslip angle of the vehicle.

11. The method of claim 8, wherein the operator response information includes one or more of:
   a response time by the operator to the oversteer event;
   appropriateness of a response of the operator to a degree of instability caused by the oversteer event;
   a trajectory deviation during the oversteer event from a pre-oversteer event vehicle trajectory;
   a smoothness of a path taken by the vehicle during the oversteer event;
   an amount of assistance provided by an electronic stability control system of the vehicle during the oversteer event; and
   closeness to a boundary of stability of the vehicle during the oversteer event.

12. The method of claim 8, further comprising the step of modifying one or more parameters of an electronic stability control system of the vehicle based on the operator response information.

13. The method of claim 8, further comprising the step of modifying, by the processor, one or more parameters of a training program for training the operator of the vehicle based on the operator response information.

14. A non-transitory computer-readable medium having instructions that, when executed by a processor, cause the processor to:
   determine a predicted skid area indicating an area that encompasses predicted paths and resting locations the vehicle will utilize when an oversteer event occurs;
   determine when a vehicle is operating within a safe area when the predicted skid area does not include one or more objects;
   apply at least one brake of the vehicle when the vehicle is operating within the safe area to cause the vehicle to engage in an oversteer event; and
   collect operator response information when the vehicle engages in the oversteer event.

\* \* \* \* \*